United States Patent
Ueno et al.

(10) Patent No.: US 10,804,823 B2
(45) Date of Patent: Oct. 13, 2020

(54) MOTOR AND WASHING MACHINE HAVING THE SAME

(71) Applicant: Samsung Electronics Co., Ltd., Suwon-si, Gyeonggi-do (KR)

(72) Inventors: Tomonori Ueno, Yokohama (JP);
Hiroshi Katsumoto, Yokohama (JP);
Taro Yoshida, Yokohama (JP);
Hidekazu Funakoshi, Yokohama (JP);
Yukinori Nakagawa, Yokohama (JP);
Yasuyuki Sonoda, Yokohama (JP);
Masaki Oshige, Yokohama (JP);
Yasumasa Nagasaki, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/228,355

(22) Filed: Dec. 20, 2018

(65) Prior Publication Data
US 2019/0190413 A1 Jun. 20, 2019

(30) Foreign Application Priority Data

Dec. 20, 2017 (JP) ................................ 2017-243891
Sep. 13, 2018 (KR) ........................ 10-2018-0109588

(51) Int. Cl.
*H02P 6/16* (2016.01)
*H02K 11/215* (2016.01)
(Continued)

(52) U.S. Cl.
CPC .............. *H02P 6/16* (2013.01); *D06F 37/304* (2013.01); *H02K 1/2773* (2013.01);
(Continued)

(58) Field of Classification Search
CPC .... H02P 1/00; H02P 1/04; H02P 1/163; H02P 1/16; H02P 1/22; H02P 1/24; H02P 1/26;
(Continued)

(56) References Cited

U.S. PATENT DOCUMENTS 5,553,675 A * 9/1996 Pitzen ................ A61B 17/1628
173/217
6,060,809 A * 5/2000 Pengov ................ H02K 19/103
310/168

(Continued)

FOREIGN PATENT DOCUMENTS

CN 201403039 Y 2/2010
JP 2003-174792 A 6/2003
(Continued)

OTHER PUBLICATIONS

ISA/KR, "International Search Report," Application No. PCT/KR2018/016265, dated Apr. 5, 2019, 3 pages.

*Primary Examiner* — Eduardo Colon Santana
*Assistant Examiner* — Antony M Paul

(57) ABSTRACT

Provided is a washing machine including: a stator including a coil; a rotor including a plurality of variable magnets each having a magnetic force variable, and rotatable with respect to the stator; a controller configured to control an energizing of the coil to increase or decrease a magnetic force of the variable magnet; and a plurality of position sensors each having a output voltage changed according to a magnetic flux of the variable magnet.

18 Claims, 14 Drawing Sheets

(51) Int. Cl.
*H02K 11/30* (2016.01)
*D06F 37/30* (2020.01)
*H02K 21/12* (2006.01)
*H02P 6/30* (2016.01)
*H02K 16/02* (2006.01)
*H02K 7/14* (2006.01)
*H02K 21/22* (2006.01)
*H02K 11/33* (2016.01)
*H02K 1/27* (2006.01)
*H02K 21/14* (2006.01)

(52) U.S. Cl.
CPC ............. *H02K 1/2786* (2013.01); *H02K 7/14* (2013.01); *H02K 11/215* (2016.01); *H02K 11/30* (2016.01); *H02K 11/33* (2016.01); *H02K 16/02* (2013.01); *H02K 21/12* (2013.01); *H02K 21/125* (2013.01); *H02K 21/145* (2013.01); *H02K 21/222* (2013.01); *H02P 6/30* (2016.02)

(58) Field of Classification Search
CPC .... H02P 1/265; H02P 1/38; H02P 1/46; H02P 1/48; H02P 3/00; H02P 6/00; H02P 6/002; H02P 6/12; H02P 6/14; H02P 6/147; H02P 9/009; H02P 9/14; H02P 21/00; H02P 21/0035; H02P 21/12; H02P 21/06; H02P 21/14; H02P 21/141; H02P 23/00; H02P 27/00; H02P 27/04; H02P 27/06
USPC .... 318/400.01, 400.02, 400.14, 400.15, 700, 318/701, 727, 779, 799, 800, 801, 430, 318/437, 599, 432
See application file for complete search history.

(56) References Cited

U.S. PATENT DOCUMENTS

| | | | | |
|---|---|---|---|---|
| 7,936,145 | B2* | 5/2011 | Schmid | G01K 7/36 318/471 |
| 8,248,018 | B2* | 8/2012 | Maekawa | H02K 1/276 310/156.03 |
| 8,327,670 | B2* | 12/2012 | Maekawa | D06F 37/304 318/701 |
| 8,704,467 | B2* | 4/2014 | Hosoito | D06F 37/306 318/370 |
| 9,197,119 | B2* | 11/2015 | Shiga | H02K 29/08 |
| 2004/0112096 | A1* | 6/2004 | Stephens | D06F 37/304 68/12.02 |
| 2005/0248306 | A1* | 11/2005 | Chen | H02P 6/16 318/712 |
| 2015/0084559 | A1* | 3/2015 | Hirata | H02P 6/16 318/400.13 |
| 2017/0353130 | A1* | 12/2017 | Park | H02P 6/16 |

FOREIGN PATENT DOCUMENTS

| | | |
|---|---|---|
| JP | 2011188668 A | 9/2011 |
| JP | 2012191690 A | 10/2012 |
| JP | 5121623 B2 | 1/2013 |
| JP | 6030466 B2 | 11/2016 |
| JP | 2017-028949 A | 2/2017 |
| KR | 10-2014-0109067 A | 9/2014 |
| WO | 2013044440 A1 | 4/2013 |

* cited by examiner

MOTOR AND WASHING MACHINE HAVING THE SAME

CROSS-REFERENCE TO RELATED APPLICATION

This application is based on and claims priority under 35 U.S.C. § 119 to Japanese Patent Application No. 2017-243891, filed on Dec. 20, 2017 in the Japan Patent Office, and Korean Patent Application No. 2018-0109588, filed on Sep. 13, 2018 in the Korean Intellectual Property Office, the disclosures of which are incorporated herein by reference.

BACKGROUND

1. Field

The present disclosure relates to a motor and a washing machine having the same.

2. Description of the Related Art

Conventionally, there has been known a motor including a rotor magnet that is provided at a side of a rotor and includes a fixed magnet and a variable magnet having a coercive force smaller than that of the fixed magnet at a level at which the amount of magnetization is easily changed.

The conventional motor allows an exciting current for changing the amount of magnetization of the variable magnet to flow in a winding of a stator through an inverter circuit, so that the amount of magnetization of the variable magnet is increased (magnetization) to thereby increase the magnetic flux of the entire rotor magnet when a low-speed rotation and a high-output torque are required, and the amount of magnetization of the variable magnet is decreased (demagnetization) to thereby decrease the magnetic flux of the entire rotor magnet when a high-speed rotation and a low output torque are required.

In order to change the amount of magnetization of the variable magnet by allowing the excitation current to flow in the variable magnet, there is a need to accurately detect the position of the variable magnet. Accordingly, as a position sensor, a digital hall sensor is used in which on/off switching output is obtained according to the strength of the magnetic force. In the case of decreasing the magnetic force of the variable magnet, an edge position at which the switching output of the hall sensor is switched, that is, a boundary position for determining whether or not a variable magnet is present may not be accurately identified, so there is a possibility that misdetection of the position of the variable magnet occurs.

SUMMARY

Therefore, it is an object of the present disclosure to provide a motor capable of accurately detecting the position of a variable magnet.

Additional aspects of the invention will be set forth in part in the description which follows and, in part, will be obvious from the description, or may be learned by practice of the invention.

Therefore, it is an aspect of the present invention to provide a washing machine including: a stator including a coil; a rotor including a plurality of variable magnets each having a magnetic force variable, and configured to be rotatable with respect to the stator; at least one processor configured to control an energizing operation of the coil to increase or decrease a magnetic force of the variable magnet; and a plurality of position sensors each having an output voltage changed according to a magnetic flux of the variable magnet.

Two position sensors adjacent to each other among the plurality of position sensors may be spaced apart from each other by an electrical angle of 120 degrees or 90 degrees.

The plurality of position sensors each may have an output voltage linearly changed according to the magnetic flux of the variable magnet.

The at least one processor may control the energizing operation of the coil such that magnetization of the variable magnet through two-phase energizing is performed within a predetermined range from one end of the variable magnet.

Two position sensors adjacent to each other among the plurality of position sensors may be spaced apart from each other by an electrical angle of 120 degrees or greater.

The at least one processor may rotate the rotor in one direction, and controls the energizing operation of the coil such that magnetization is performed on a front side portion of the variable magnet in a direction that the rotor rotates.

The at least one processor may rotate the rotor in a direction reverse to the one direction, and control the energizing operation of the coil such that magnetization is performed on a front side portion of the variable magnet in a direction that the rotor rotates.

The at least one processor may rotate the rotor in one direction, and control the energizing operation of the coil such that demagnetization is performed on a rear side portion of the variable magnet n a direction that the rotor rotates.

The at least one processor may rotate the rotor in a direction reverse to the one direction, and control the energizing operation of the coil such that demagnetization is performed on a rear side portion of the variable magnet in a direction that the rotor rotates.

The at least one processor may control the energizing operation of the coil such that the magnetic forces of the variable magnets are made uniform when a difference between the variable magnets is greater than a preset reference value.

The control may control the energizing operation of the coil to magnetize the variable magnet having a magnetic force less than a predetermined value when increasing the magnetic force of the variable magnet, and demagnetize the variable magnet having a magnetic force greater than the predetermined value when decreasing the magnetic force of the variable magnet.

It is another aspect of the present invention to provide a motor including: a stator including a coil; a rotor including a plurality of variable magnets each having a magnetic force variable, and configured to be rotatable with respect to the stator; at least one processor configured to control an energizing operation of the coil to increase or decrease a magnetic force of the variable magnet; and a plurality of position sensors each having an output voltage changed according to a magnetic flux of the variable magnet.

Two position sensors adjacent to each other among the plurality of position sensors may be spaced apart from each other by an electrical angle of 120 degrees or 90 degrees.

The plurality of position sensors each may have an output voltage linearly changed according to the magnetic flux of the variable magnet.

The at least one processor may control the energizing operation of the coil such that magnetization of the variable magnet through two-phase energizing is performed within a predetermined range from one end of the variable magnet.

Two position sensors adjacent to each other among the plurality of position sensors may be spaced apart from each other by an electrical angle of 120 degrees or greater.

The at least one processor may rotate the rotor in one direction, and control the energizing operation of the coil such that magnetization is performed on a front side portion of the variable magnet in a direction that the rotor rotates.

The at least one processor may rotate the rotor in a direction reverse to the one direction, and control the energizing operation of the coil such that magnetization is performed on a front side portion of the variable magnet in a direction that the rotor rotates.

The at least one processor may rotate the rotor in one direction, and control the energizing operation of the coil such that demagnetization is performed on a rear side portion of the variable magnet in a direction that the rotor rotates.

The at least one processor may rotate the rotor in a direction reverse to the one direction, and control the energizing operation of the coil such that demagnetization is performed on a rear side portion of the variable magnet in a direction that the rotor rotates.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
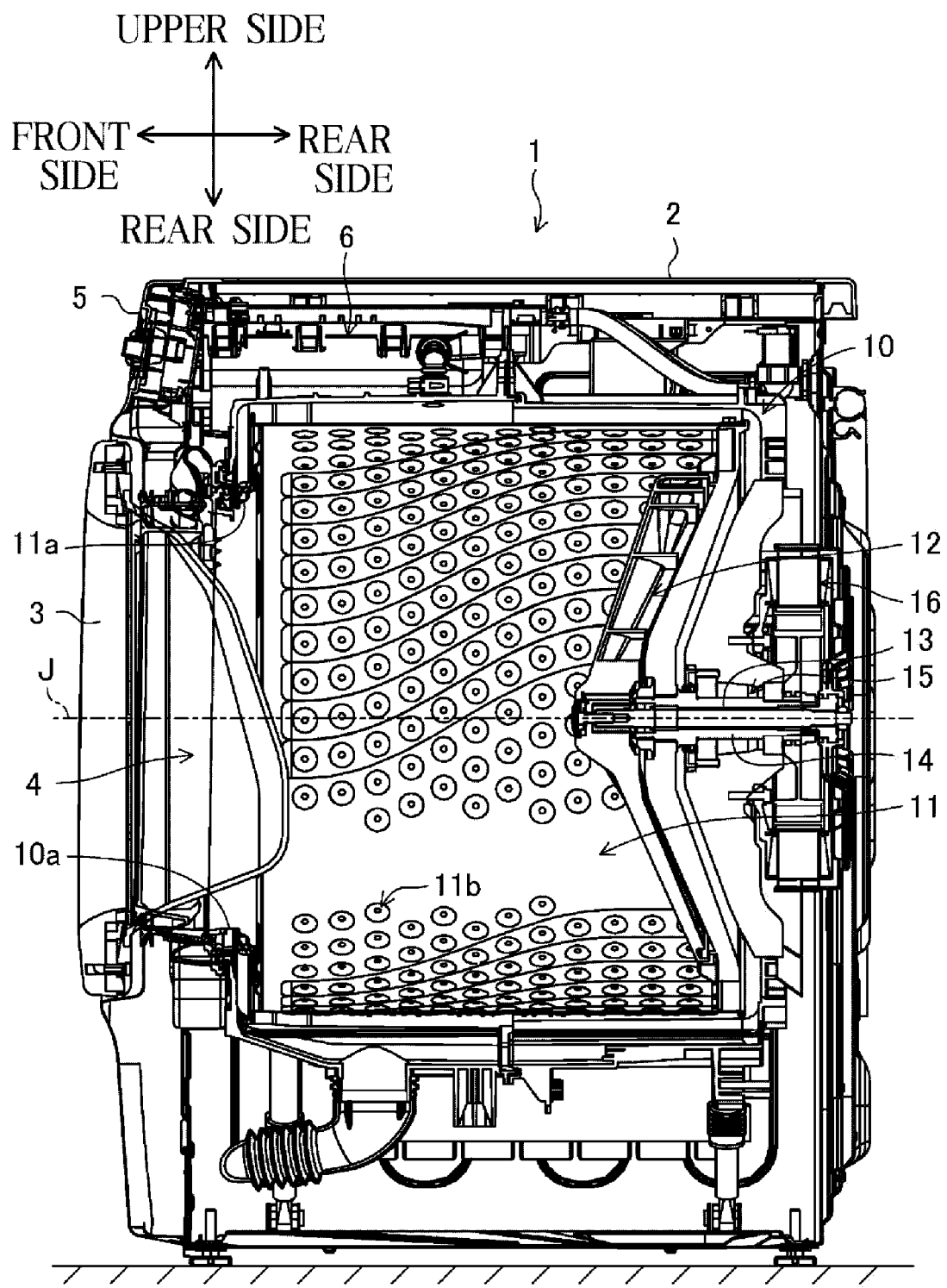
FIG. 1 is a side sectional view illustrating a configuration of a washing machine according to an embodiment.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the following description, when an element (or layer) is referred to as being "on" another element (or layer), the element (or the layer) can be directly on another element (or layer) or intervening layers may also be present therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, embodiments will be described with reference to the accompanying drawings.

Overall Configuration of Washing Machine

FIG. 1 is a side sectional view illustrating a configuration of a washing machine 1 according to an embodiment.

Referring to FIG. 1, the washing machine 1 according to the embodiment may be a fully automated washing machine capable of performing washing, rinsing, and spin dry processes in an automated control.

The washing machine 1 has a housing 2 in the form of a rectangular box, and the housing 2 is provided on a front side thereof with a circular inlet 4 which is opened or closed by a door 3. Loading and unloading of laundry is performed through the inlet 4.

The housing 2 is provided on a front upper side thereof with a manipulating portion 5 on which switches and the like are arranged, and a controller 6 (a control unit) is embedded behind the manipulating portion 5. A water tub 10, a drum 11, a motor 16, a pulsator 12, and the like are disposed inside the housing 2.

The water tub 10 is a bottomed cylindrical container that is provided at one end thereof with an opening 10a having a diameter smaller than an inner diameter thereof. The water tub 10 is disposed inside the housing 2 with the opening 10a directed toward the inlet 4, and a center line thereof extending substantially horizontally in a front and rear side direction. During washing or rinsing, washing water or rinse water is stored in a lower portion of the water tub 10.

The drum 11 is a bottomed cylindrical container that is provided at one end thereof with an opening 11a and at the other end thereof with a base portion. The drum 11 is disposed inside the water tub 10 with the opening 11a directed forward. The drum 11 is provided to be rotatable on a rotation axis J extending in a front and rear side direction, and the respective cycles such as washing, rinsing, spinning and the like are performed in a state in which the laundry is contained in the drum 11.

A plurality of water through-holes 11b penetrating the inside and outside of the drum 11 are formed in a peripheral wall portion of the drum 11. The washing water stored in the water tub 10 is introduced into the drum 11 through the water through-holes 11b.

A pulsator 12 is disposed at the base portion of the drum 11. The pulsator 12 is provided to be rotatable about the rotation axis J independently of the drum 11.

A double shaft 15 composed of an inner shaft 13 and an outer shaft 14 is installed to penetrate a bottom surface of the water tub 10 with the rotation axis J as the center. The outer shaft 14 is a cylindrical shaft having an axial length shorter than that of the inner shaft 13.

The inner shaft 13 is rotatably and axially supported in the outer shaft 14, and is connected to the pulsator 12 at a front end portion thereof to support the pulsator 12. The outer shaft 14 is rotatably and axially supported by the water tub 10, and is connected to the drum 11 at a front end portion thereof to support the drum 11. Proximal end portions of the outer shaft 14 and the inner shaft 13 are connected to the motor 16 disposed on the rear side of the water tub 10.

The motor 16 has a flat cylindrical external appearance with a diameter smaller than that of the water tub 10 and is attached to the rear side of the water tub 10. The motor 16 drives the outer shaft 14 and the inner shaft 13 independently of each other. The controller 6 includes hardware, such as a central processing unit (CPU) and a memory, and software, such as a control program. The controller 6 comprehensively controls the washing machine 1 and automatically operates each cycle, such as washing, rinsing, spinning, and the like, in accordance with an instruction input from the manipulating portion 5.

The motor 16 and the controller 6 for controlling the motor 16 are included in a motor device.

Motor

Figure 2:
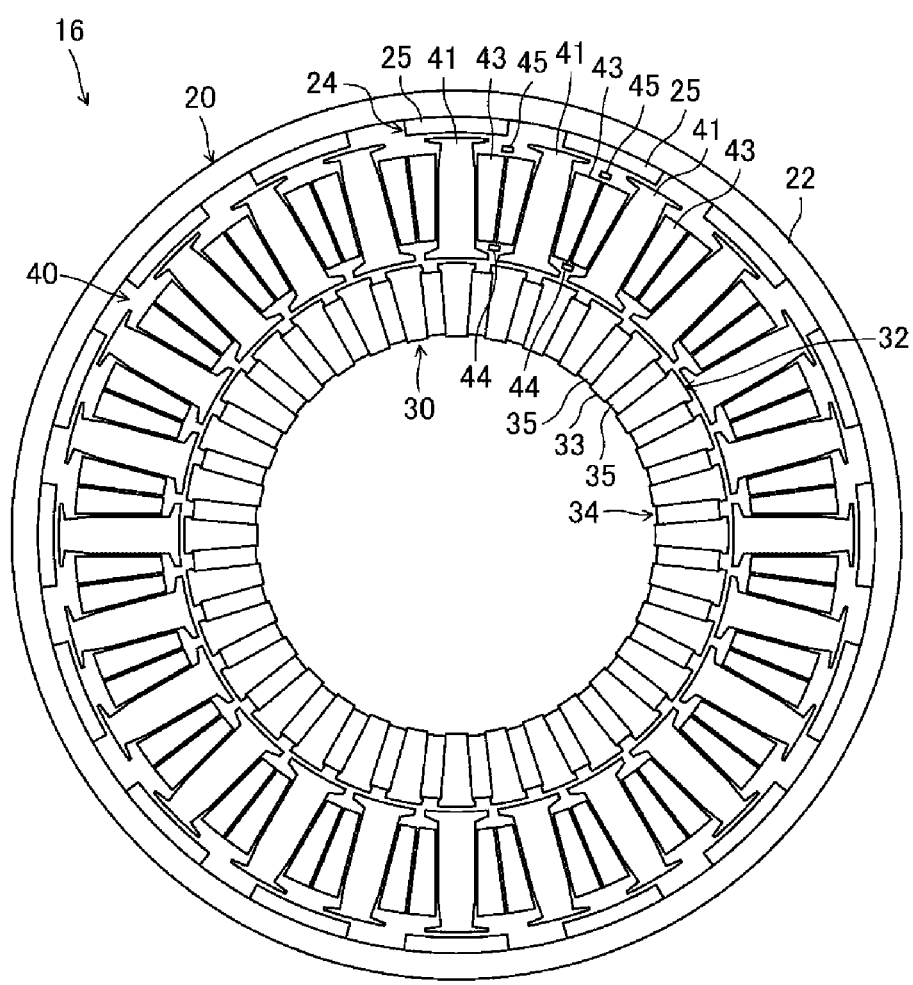
FIG. 2 is a plan view illustrating an overall configuration of a motor according to an embodiment.
Figure 3:
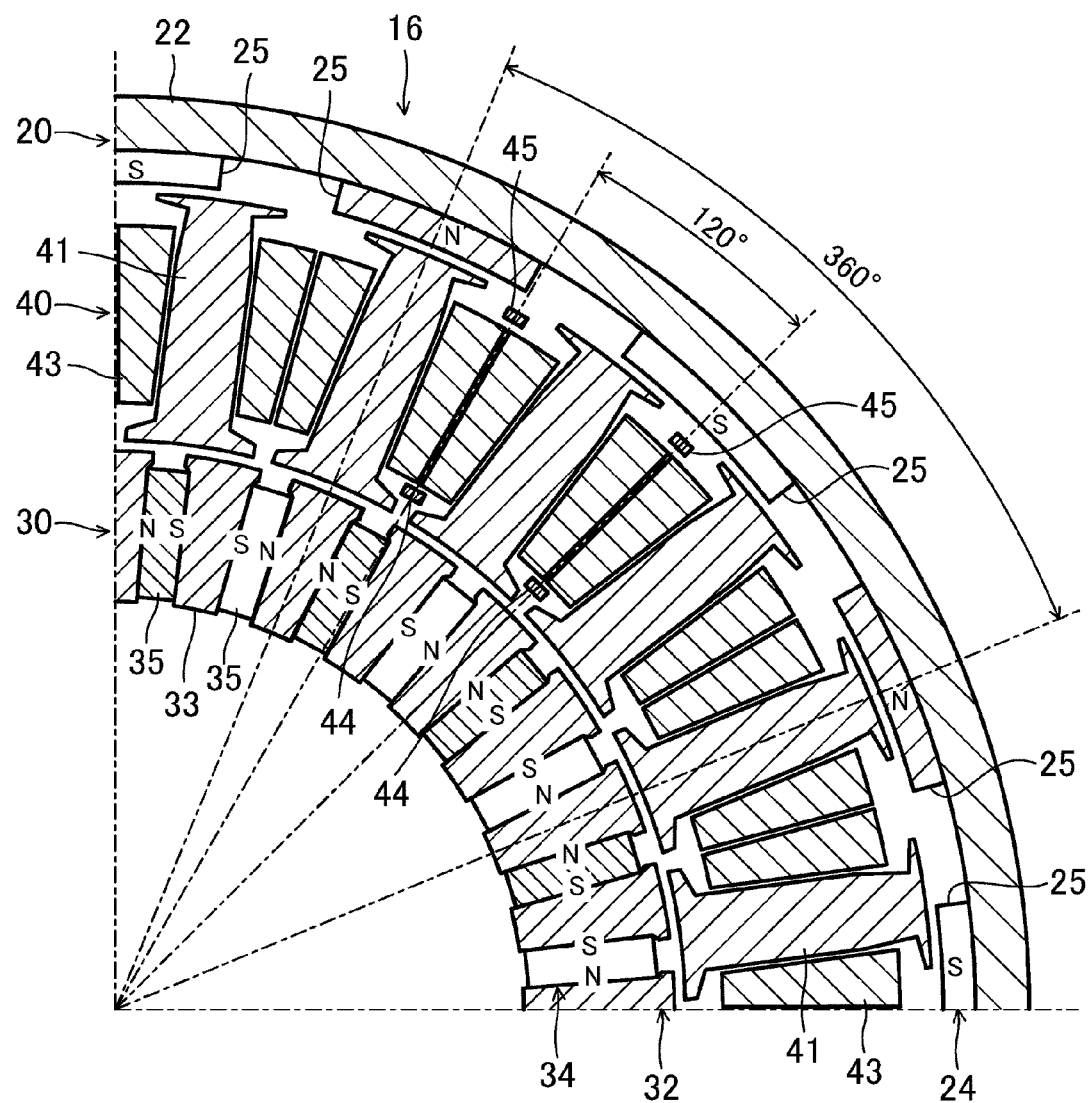
FIG. 3 is a plan view illustrating a main part of a motor according to an embodiment.

FIG. 2 is a plan view illustrating an overall configuration of a motor according to an embodiment, and FIG. 3 is a plan view illustrating a main part of a motor according to an embodiment.

Referring to FIG. 2, the motor 16 includes an outer rotor 20, an inner rotor 30, a stator 40, and the like. That is, the motor 16 may be a dual rotor motor including the outer rotor 20 and the inner rotor 30 provided at an inner side and an outer side in a radial direction of the stator 40.

The outer rotor 20 and the inner rotor 30 are connected to the pulsator 12 or the drum 11 without interposing a clutch or an accelerating and decelerating device therebetween, to directly drive the pulsator 12 or the drum 11.

The outer rotor 20 and the inner rotor 30 share a coil 43 of the stator 40, and upon supply of electrical current to the coil 43, the motor 16 rotationally drivers the outer rotor 20 and the inner rotor 30 independently of each other.

The outer rotor 20 is a flat bottomed cylindrical member, and has a rotor yoke 22 installed standing upright around the base portion and a plurality of outer magnets 24 formed of an arc-shaped permanent magnet.

The outer rotor 20 may be a consequent-type rotor, and include sixteen outer magnets 24 that are provided with S poles and N poles alternately arranged at intervals in the circumferential direction and fixed to an inner surface of the rotor yoke 22. As to be described later in detail, the outer magnet 24 may be embodied as a variable magnet 25 capable of increasing or decreasing the magnetic force by controlling the energizing operation of the coil 43.

The inner rotor 30 is a flat bottomed cylindrical member with an outer diameter smaller than that of the outer rotor 20, and includes an inner peripheral wall portion 32 installed standing upright around the base portion and a plurality of inner magnets 34 implemented as a rectangular plate-shaped permanent magnet.

The inner rotor 30 may be a spoke type rotor, and includes thirty two of the inner magnets 34 radially disposed while being spaced apart from each other in the circumferential direction and fixed to the inner peripheral wall portion 32. Rotor cores 33 may be disposed between the inner magnets 34 in the circumferential direction.

The stator 40 is provided as an annular member having an outer diameter smaller than the inner diameter of the outer rotor 20 and an inner diameter larger than the outer diameter of the inner rotor 30. The stator 40 includes a plurality of teeth 41, coils 43, and the like buried embedded in a resin. The stator 40 may include twenty four I-shaped teeth 41 and coils 43.

The teeth 41 are thin plate-shaped iron members having longitudinal cross-sections in an I-shape, and are radially arranged at regular interval to be arranged around the entire circumference of the stator 40. An inner circumferential side end portion and an outer circumferential side end portion of the teeth 41 each protrude from both corners thereof in the circumferential direction to form a flange-shape.

The coil 43 is formed for each tooth 41 by continuously winding three wires covered with an insulating material in a predetermined order and configuration. A group of the teeth 41 on which the coil 43 is buried in a thermosetting resin by mold molding in a state in which only side end surfaces of respective diameters are exposed, and are fixed in a certain arrangement in an insulated state.

The stator 40, the inner rotor 30, and the outer rotor 20 are attached such that the end portion of the tooth 41 on the side of the inner rotor 30 faces the rotor core 33 with a small gap and the end portion of the tooth 41 on the side of the outer rotor 20 faces the outer magnet 24 with a small gap.

A digital inner-side position sensor 44 is disposed between adjacent teeth 41 in the vicinity of the inner rotor 30. The inner-side position sensor 44 is provided to identify the position of the inner rotor 30.

In addition, an analog outer-side position sensor 45 is disposed between adjacent teeth 41 in the vicinity of the outer rotor 20. The outer-side position sensor 45 is provided as a hall sensor and serves to identify the position of the outer rotor 20.

In the motor 16 according to the embodiment, when the coil 43 of the stator 40 is energized, different poles are simultaneously generated on the outer side and the inner side of the tooth 41, and the outer rotor 20 and the inner rotor 30 rotate independently of each other according to a rotating magnetic field.

As described above, the stator 40 is shared by the outer rotor 20 and the inner rotor 30, rotation driving of the outer rotor 20 and the inner rotor 30 may be performed in a plurality of rotation modes using one inverter.

Referring to FIG. 3, the outer magnet 24 may be implemented as a variable magnet 25. The inner magnet 34 may be implemented as a fixed magnet 35. Here, the variable magnet 25 is a magnet that has a magnetic force variable when a magnetizing current s supplied to the coil 43. The fixed magnet 35 is a magnet that has a magnetic force invariable even when a magnetizing current is supplied to the coil 43.

The controller 6 may increase or decrease the magnetic force of the variable magnet 25 by controlling the energizing operation to the coil 43 to allow the magnetic flux to flow in the variable magnet 25. Here, in order to flow the magnetic flux in the variable magnet 25, the position of the variable magnet 25 needs to be accurately detected. Accordingly, in order to accurately detect the position of the variable magnet 25 of the outer rotor 20, a plurality of the outer-side position sensors 45 (for example, two outer-side position sensors) may be provided.

In detail, the two outer-side position sensors 45 may be arranged while being spaced apart from each other by an electrical angle of 120 degrees. The outer-side position sensor 45 may be implemented as an analog type Hall sensor in which the output voltage linearly changes according to the magnetic flux of the variable magnet 25.

Figure 4:
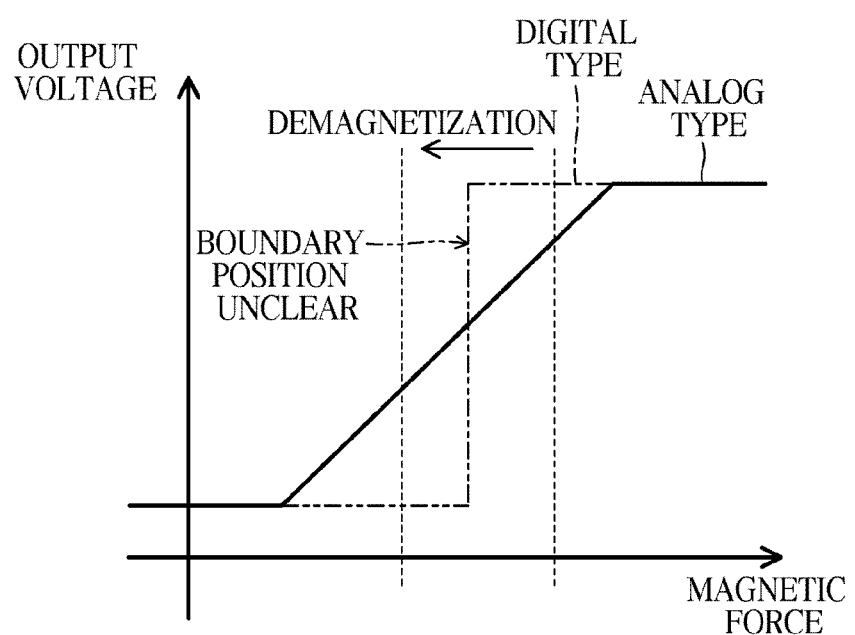
FIG. 4 is a view for describing the difference between outputs of an analog type position sensor and a digital type position sensor.

FIG. 4 is a view for describing the difference between outputs of an analog type position sensor and a digital type position sensor.

Referring to FIG. 4, even at a time of decreasing the magnetic force of the variable magnet 25, the output voltage of the outer-side position sensor 45 is linearly changed to a large extent according to the magnetic flux of the variable magnet 25 since the analog type outer-side position sensor 45 is used. Accordingly, the boundary position for determining the existence of the variable magnet 25 is prevented from missing, so that misdetection of the position of the variable magnet 25 may be prevented.

Since the two outer-side position sensors 45 are arranged to be separated from each other by an electrical angle of 120 degrees, at least one of the two outer-side position sensors 45 detects the position of the variable magnets 25, to thereby improve the position detection precision of the variable magnet 25.

Although the above embodiment has been described in relation to the two outer-side position sensors 45 disposed at an electrical angle of 120 degrees apart from each other, the number and the electrical angle of the outer side position sensors 45 are not limited thereto. For example, outer-side position sensors 45 adjacent to each other may be disposed while being spaced apart from each other by an electrical angle of 90 degrees.

In addition, the two inner-side position sensors 44 for detecting the position of the inner magnet 34 may be arranged while being spaced apart from each other by an electrical angle of 120 degrees. The inner-side position sensor 44 is implemented as a digital hall sensor which obtains ON/OFF switching outputs according to the magnitude of the magnetic force.

Although the above embodiment has been described in relation to the two inner-side position sensors 44 arranged at an electrical angle of 120 degrees apart from each other, the number and the electrical angle of the inner-side position sensors 44 are not limited thereto. For example, inner-side position sensors 44 adjacent to each other may be disposed while being spaced apart from each other by an electrical angle of 90 degrees.

Two-Phase Energizing

Figure 5:
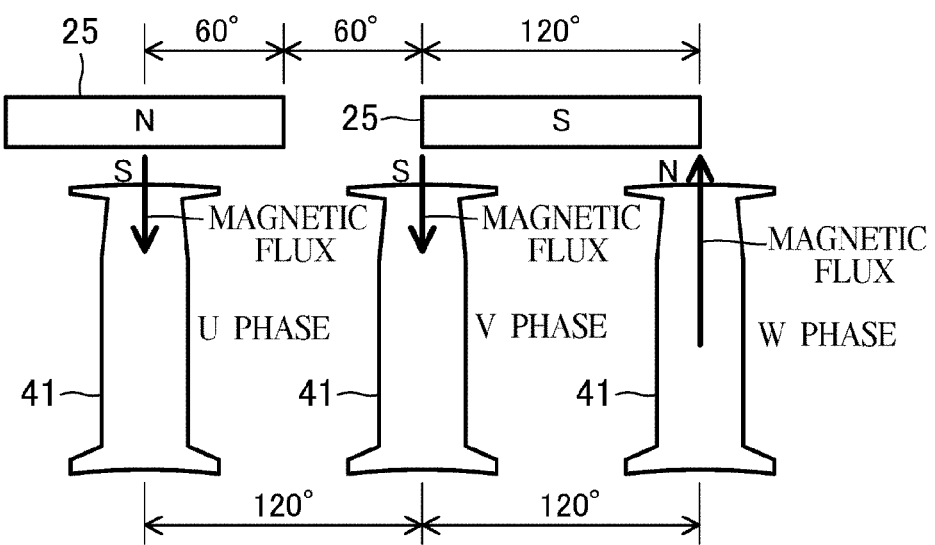
FIG. 5 is a view for describing the flow of magnetic flux in three-phase energizing.
Figure 6:
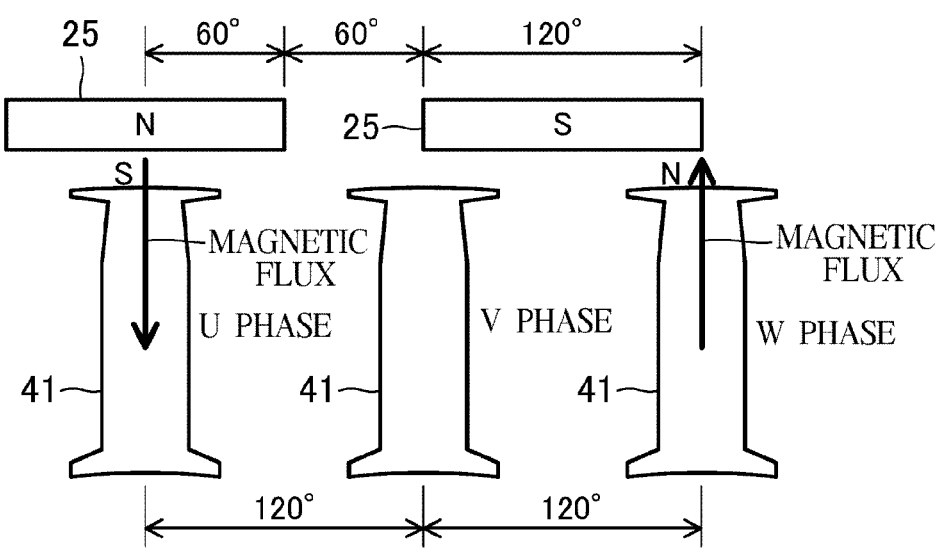
FIG. 6 is a view for describing the flow of magnetic flux in two-phase energizing.

FIG. 5 is a view for describing the flow of magnetic flux during three-phase energizing, and FIG. 6 is a view for describing the flow of magnetic flux during two-phase energizing. Referring to FIG. 5, inside the variable magnet 25, the magnetic flux flows from the S pole to the N pole. Accordingly, in the case of increasing the magnetic force of the variable magnet 25, when the pole of the variable magnet 25 facing the tooth 41 is the S pole, the energizing operation on the coil 43 needs to be controlled such that the magnetic flux flows in the same direction as that of the magnetic flux inside the variable magnet 25, that is, the magnetic flux flows from the tooth 41 to the variable magnet 25. When the pole of the variable magnet 25 facing the tooth 41 is the N pole, the energizing operation on the coil 43 needs to be controlled such that the magnetic flux flows in the same direction as that of the magnetic flux inside the variable magnet 25, that is, the magnetic flux flows from the variable magnet 25 to the tooth 41.

However, when a magnetic flux flows from a W-phase tooth 41 to the S-pole variable magnet 25 among U-phase, V-phase and W-phase teeth 41 and one end of the S-pole variable magnet 25 (the right end of the S pole in FIG. 5) is magnetized, the magnetic flux is divided from the side of the outer rotor 20 toward the U-phase teeth 41 and the V-phase tooth 41. At this time, the other end of the S pole variable magnet 25 (the left end of the S-pole in FIG. 5) faces the V-phase tooth 41 since the width between the variable magnets 25 is 120 degrees of the electrical angle. As a result, the other end of the S-pole variable magnet 25 (the left end of the S-pole in FIG. 5) is demagnetized due to the magnetic flux directed from the side of the outer rotor 20 to the V-phase tooth 41.

Accordingly, the motor 16 according to the embodiment performs magnetization through two-phase energizing on an area of the variable magnet 25 within a predetermined range from one end of the variable magnet 25 when the width between the variable magnets 25 is equal to or greater than 120 degrees of the electrical angle.

In detail, the controller 6 of the motor 16 according to the embodiment may control such that the energizing of the V-phase coil 43 is stopped and the magnetic flux flowing from the W-phase tooth 41 to one end of the S-pole variable magnet 25 (the right end of the S pole in FIG. 6) flows through the N-pole variable magnet 25 toward the U-phase tooth 41. At this time, the N-pole variable magnet 25 is also magnetized.

As described above, since no flow of magnetic flux occurs between the other end of the S-pole variable magnet 25 (the left end of the S pole in FIG. 6) and the V-phase tooth 41, the other end of the S-pole variable magnet 25 (the left end of the S pole in FIG. 6) of the S-pole variable magnet 25 facing the V-phase tooth 41 is not demagnetized at the time of magnetizing the one end of the S pole variable magnet 25 (the tight end of the S pole in FIG. 6) Thereby, the entire variable magnet 25 may be magnetized.

Regarding the Timing of Magnetization or Demagnetization

Figure 7:
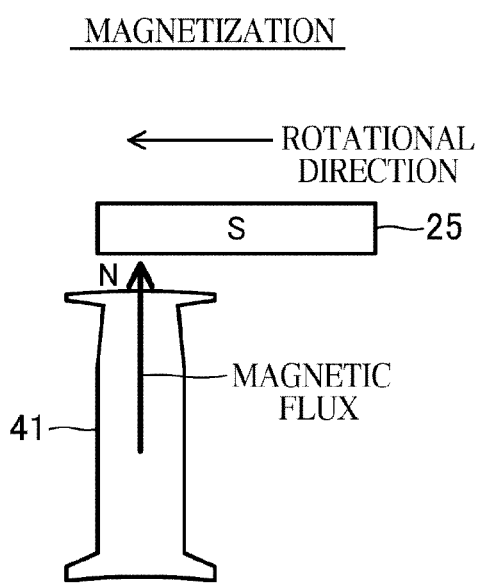
FIG. 7 is a view for describing a timing of magnetizing an S-pole variable magnet.
Figure 8:
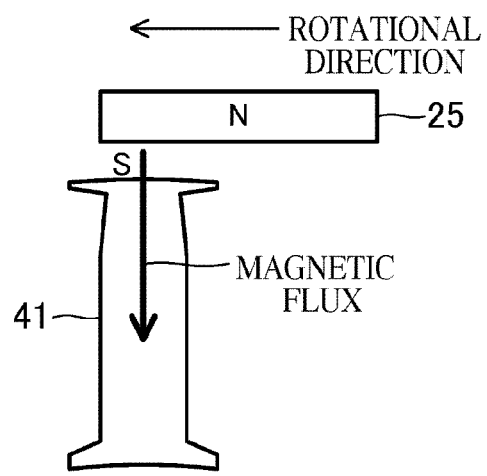
FIG. 8 is a view for describing a timing of magnetizing an N-pole variable magnet.
Figure 9:
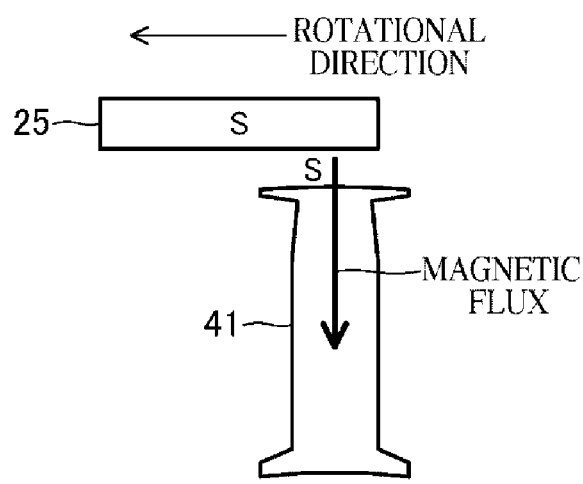
FIG. 9 is a view for describing a timing of demagnetizing an S-pole variable magnet.
Figure 10:
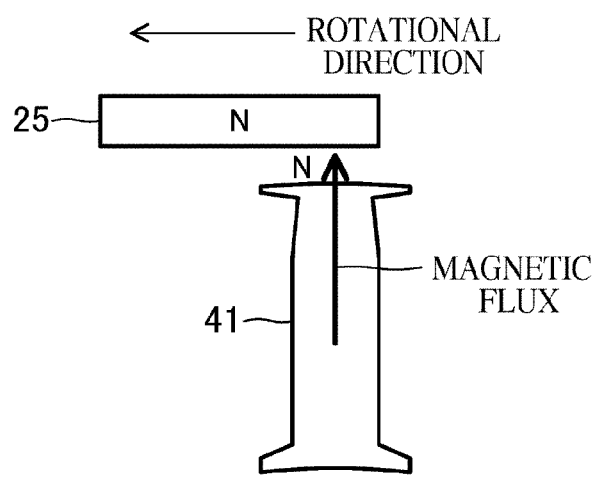
FIG. 10 is a view for describing a timing of demagnetizing an N-pole variable magnet.

FIG. 7 is a view for describing a timing of magnetizing an S-pole variable magnet, FIG. 8 is a view for describing a timing of magnetizing an N-pole variable magnet, FIG. 9 is a view for describing a timing of demagnetizing a S-pole variable magnet, and FIG. 10 is a view for describing ng of demagnetizing an N-pole variable magnet.

Referring to FIGS. 7 to 10, at a time of increasing or decreasing the magnetic force of the variable magnet 25, the rotational direction of the outer rotor 20 and the position of the variable magnet 25 may be considered.

First, the following description will be made in relation to a case when the outer rotor 20 rotates in one direction (the left direction in FIG. 7) and the S-pole variable magnet 25 facing the tooth 41 is magnetized as shown in FIG. 7.

In this case, when the magnetic flux flows from the tooth 41 toward the front side portion (the left side portion in FIG. 7) of the variable magnet 25 in the rotational direction during the rotation of the outer rotor 20, the left side portion of the variable magnet 25 is magnetized. As a result, an attractive force acts between the left side portion of the variable magnet 25 and the tooth 41 when the variable magnet 25 is magnetized, and the outer rotor 20 is accelerated in the rotational direction, so that magnetization noise is reduced.

Also, after the left side portion of the variable magnet 25 is magnetized, the outer rotor 20 may be reversely rotated and the right side portion (the rear side portion in the rotational direction in FIG. 7) is magnetized in the same manner as the above.

That is, when the magnetic flux flows from the tooth 41 toward the front side portion (the right side portion in FIG. 7) of the variable magnet 25 with respect to the reverse rotation direction during the reverse rotation of the outer rotor 20, the right side portion of the variable magnet 25 is magnetized. Accordingly, an attractive force acts between the right side portion of the variable magnet 25 and the tooth 41 when the variable magnet 25 is magnetized, and the outer rotor 20 is accelerated in the reverse rotation direction, so that the magnetization noise is reduced.

FIG. 8 shows the flow of magnetic flux when the outer rotor 20 rotates in one direction (the left direction in FIG. 8) and the N-pole variable magnet 25 facing the tooth 41 is magnetized.

Referring to FIG. 8, when a magnetic flux flows from the front side portion (the left side portion in FIG. 8) of the variable magnet 25 in the rotational direction toward the tooth 41 during rotation of the outer rotor 20, the left side portion of the variable magnets 25 is magnetized. Accordingly, an attractive force acts between the left side portion of the variable magnet 25 and the tooth 41 when the variable magnet 25 is magnetized, and the outer rotor 20 is accelerated in the rotational direction, so that the magnetization noise is reduced.

Also, after the left side portion of the variable magnet 25 is magnetized, the outer rotor 20 is rotated in the reverse direction to magnetize the right side portion (the rear side portion in the rotational direction in FIG. 8).

Next, the following description will be made in relation to a case when the outer rotor 20 rotates in one direction (the left direction in FIG. 9) and the S-pole variable magnet 25 facing the tooth 41 is demagnetized as shown in FIG. 9.

In this case, when the magnetic flux flows from the rear side portion (the right side portion in FIG. 9) of the variable magnet 25 in the rotational direction toward the tooth 41 during the rotation of the outer rotor 20, the right side portion of the variable magnet 25 is demagnetized. Accordingly, a repulsive force acts between the right side portion of the variable magnet 25 and the tooth 41 when the variable magnet 25 is demagnetized, and the outer rotor 20 is accelerated in the rotating directional direction, so that magnetization noise is reduced.

In addition, after the right side portion of the variable magnet 25 is demagnetized, the outer rotor 20 may be rotated in the reverse direction to demagnetize the left side portion (the front side portion in the rotational direction in FIG. 9) in the same way as the above.

FIG. 10 shows the flow of magnetic flux when the outer rotor 20 rotates in one direction the left side direction in FIG. 10), and the N-pole variable magnet 25 facing the tooth 41 is demagnetized.

Referring to FIG. 10, when the magnetic flux flows from the tooth 41 toward the rear side portion (the right side portion in FIG. 10) of the variable magnet 25 in the rotational direction during the rotation of the outer rotor 20, the right side portion of the magnet 25 is demagnetized. Accordingly, a repulsive force acts between the right side portion of the variable magnet 25 and the tooth 41 when the variable magnet 25 is demagnetized, and the outer rotor 20 is accelerated in the rotational direction, so that magnetization noise is reduced.

Further, after the right side portion of the variable magnet 25 is demagnetized, the outer rotor 20 is rotated in the reverse direction to demagnetize the left side portion (the front side portion in the rotational direction in FIG. 10).

Equalization of Magnetic Forces of Variable Magnets

Unbalance of the magnetic force may occur between the plurality of variable magnets 25. When the outer rotor 20 is rotated at a high speed in a state where the magnetic forces of the variable magnets 25 are not uniform, the vibration accompanied by the high-speed rotation of the outer rotor 20 becomes large, and noise is generated.

Accordingly, the controller 6 according to the embodiment controls the energizing operation of the coil 43 so that the magnetic forces of the plurality of variable magnets 25 become substantially uniform.

Figure 11:
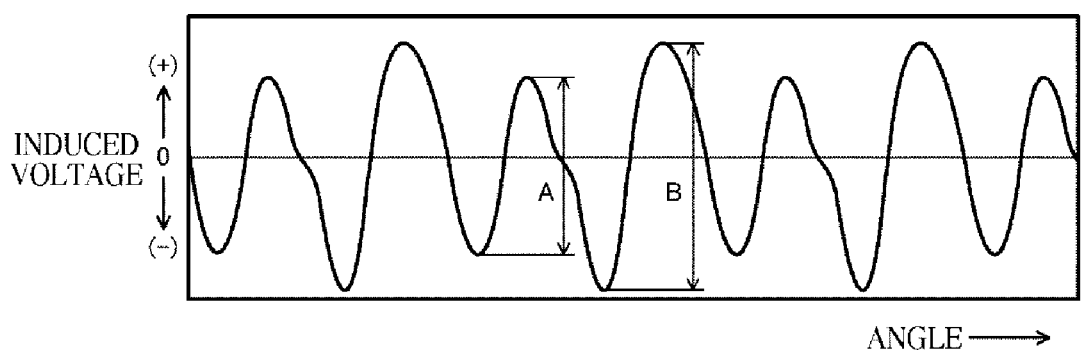
FIG. 11 is a view showing waveforms of induced voltage when the magnetic forces of a plurality of variable magnets are not uniform.
Figure 12:
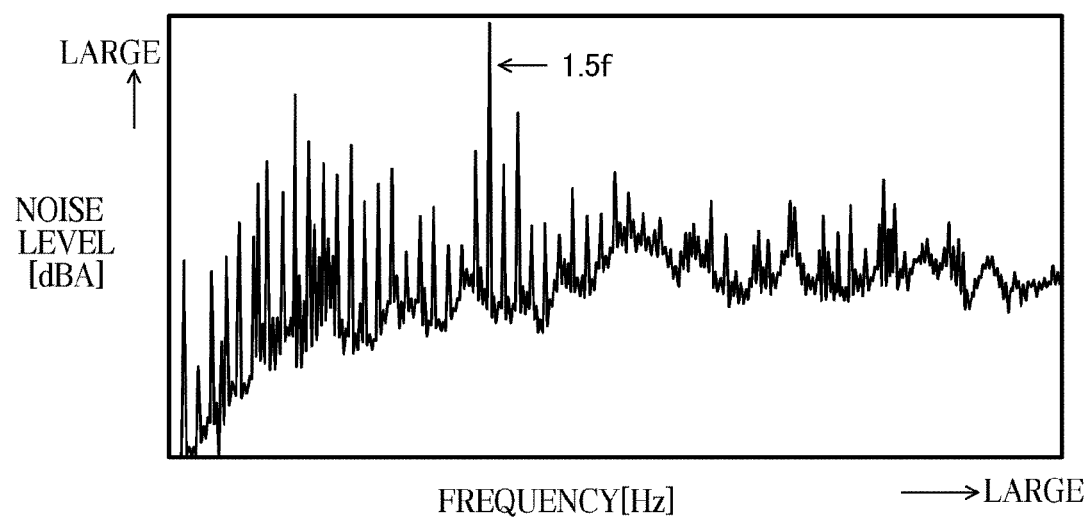
FIG. 12 is a graph showing the relationship between a frequency and a noise level when the magnetic forces of a plurality of variable magnets are not uniform.

FIG. 11 is a view showing waveforms of induced voltage when the magnetic forces of a plurality of variable magnets are not uniform, and FIG. 12 is a graph showing the relationship between a frequency and a noise level when the magnetic forces of a plurality of variable magnets are not uniform.

Referring to FIG. 11, the magnetic force of the variable magnet 25 may be determined by measuring the induced voltage generated when the outer rotor is rotated. FIG. 11 shows the induced voltage formed into a sinusoidal wave by obtaining the output signal of the outer-side position sensor 45 as a fed back.

In the waveforms of the induced voltage in FIG. 11, amplitude (B) of the induced voltage is larger than amplitude (A) of the induced voltage. A large amplitude of the induced voltage indicates a large magnetic force of the variable magnet 25, and a small amplitude of the induced voltage indicates a small magnetic force of the variable magnet 25.

When the outer rotor 20 is rotated in a state where the magnetic forces of the variable magnets 25 are not uniform, it can be seen that the noise level is large at a frequency (1.5 f component) 1.5 times the rotational frequency of the motor 16 as shown in FIG. 12.

Accordingly, the controller 6 according to the embodiment may increase or decrease the magnetic forces of the variable magnets 25 to make the magnetic forces of the variable magnets 25 uniform when the difference between the magnetic forces of the plurality of variable magnets 25 is larger than a predetermined reference value.

Figure 13:
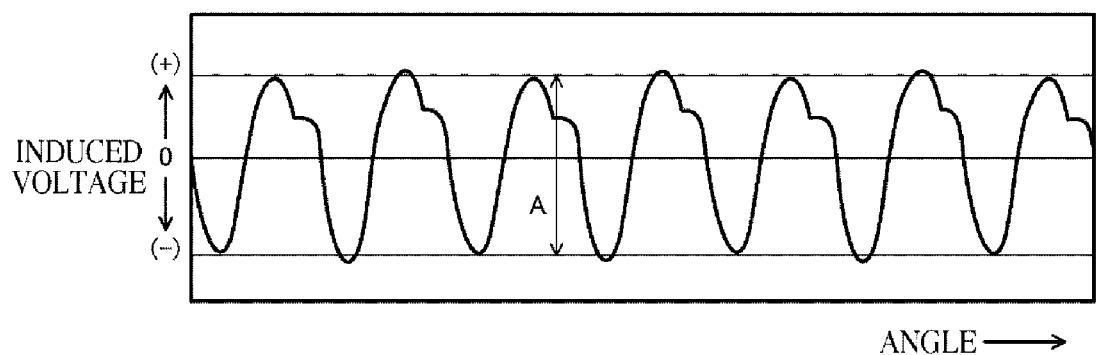
FIG. 13 is a graph showing waveforms of induced voltage when magnetic forces of a plurality of variable magnets are made uniform.
Figure 14:
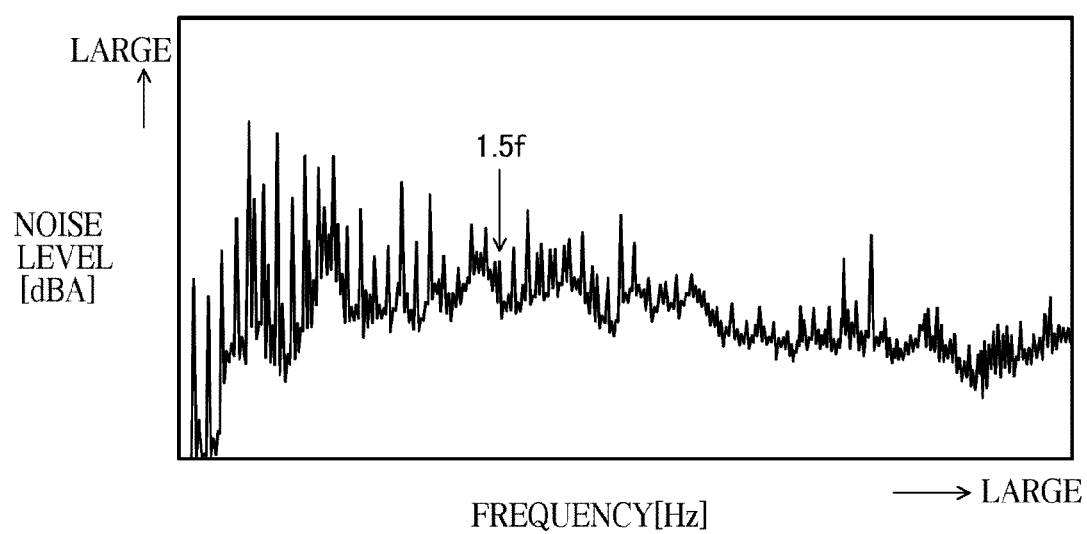
FIG. 14 is a graph showing the relationship between a frequency and a noise level when the magnetic forces of a plurality of variable magnets are made uniform.

FIG. 13 is a graph showing waveforms of induced voltage when magnetic forces of a plurality of variable magnets are made uniform, and FIG. 14 is a graph showing the relationship between a frequency and a noise level when the magnetic forces of a plurality of variable magnets are made uniform.

In detail, when the magnetic forces of the variable magnets 25 are decreased as a whole, the controller 6 according to the embodiment demagnetizes the variable magnet 25 having a magnetic force larger than a predetermined value. That is, in the example shown in FIG. 11, the controller 6 according to the embodiment changes the magnetic force of the variable magnet 25 having the amplitude B of the induced voltage so as to approximate the amplitude A by demagnetizing the variable magnet 25 having the amplitude B of the induced voltage. As a result, as shown in FIG. 13, the induced voltage becomes made substantially uniform with the amplitude A, and the magnetic forces of the plurality of variable magnets 25 may be made substantially uniform.

Referring to FIG. 14, when the magnetic forces of the plurality of variable magnets 25 are made substantially uniform, it can be seen that the noise level becomes small at the frequency (1.5 f component) 1.5 times the number of revolutions of the motor 16.

In addition, when the magnetic forces of the variable magnets 25 are increased as a whole, the controller 6 according to the embodiment magnetizes the variable magnet 25 having a magnetic force smaller than the predetermined value. That is, in the example shown in FIG. 11, the magnetic force of the variable magnet 25 having the amplitude A of the induced voltage may be changed to approximate the amplitude B by magnetizing the variable magnet 25 having the amplitude A of the induced voltage.

Other Embodiments

Although the above embodiment has been described in relation that the variable magnets 25 are installed in the outer rotor 20 to change the magnetic force of the outer rotor 20, it is also possible to install the variable magnetics in the inner rotor 30 to change the magnetic force of the inner rotor 30.

Although the above embodiment has been described in relation that the magnitude of the magnetic force of the variable magnet 25 is detected on the basis of the amplitude of the induced voltage, it is possible to detect the magnitude of the magnetic force of the variable magnet 25 by installing a magnetic flux sensor.

At least one component may be added or deleted with regard to the performance of the washing machine 1 and the motor 16 according to the above-described embodiment. It will be readily understood by those skilled in the art that the relative positions of the components may be changed corresponding to the performance or structure of the system.

Some components of the motor 16 and the washing machine 1 according to the above-described embodiment of the present disclosure may be implemented in software and/or hardware components such as Field Programmable Gate Array (FPGA) and Application Specific Integrated Circuit (ASIC).

As is apparent from the above, the motor can accurately detect the position of a variable magnet.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

Although the present disclosure has been described with various embodiments, various changes and modifications may be suggested to one skilled in the art. It is intended that the present disclosure encompass such changes and modifications as fall within the scope of the appended claims.

What is claimed is:

1. A washing machine comprising:
   a stator including a coil;
   a rotor including a plurality of variable magnets, each having a magnetic force variable and configured to be rotatable with respect to the stator;

at least one processor configured to:
control an energizing operation of the coil to increase or decrease a magnetic force of a variable magnet, and
control the energizing operation of the coil such that magnetization of the variable magnet of the plurality of variable magnets through two-phase energizing is performed within a predetermined range from one end of the variable magnet of the plurality of variable magnets; and
a plurality of position sensors each having an output voltage changed according to a magnetic flux of the variable magnet.

2. The washing machine of claim 1, wherein two position sensors adjacent to each other among the plurality of position sensors are spaced apart from each other by an electrical angle of 120 degrees or 90 degrees.

3. The washing machine of claim 1, wherein the plurality of position sensors each have output voltage linearly changed according to the magnetic flux of the variable magnet.

4. The washing machine of claim 1, wherein two position sensors adjacent to each other among the plurality of position sensors are spaced apart from each other by an electrical angle of 120 degrees or greater.

5. The washing machine of claim 1, wherein the at least one processor is further configured to:
rotate the rotor in a first direction, and
control the energizing operation of the coil such that magnetization is performed on a front side portion of the variable magnet in the first direction that the rotor rotates.

6. The washing machine of claim 5, wherein the at least one processor is further configured to:
rotate the rotor in a second direction that is reverse to the first direction, and
control the energizing operation of the coil such that magnetization is performed on a front side portion of the variable magnet in the second direction that the rotor rotates.

7. The washing machine of claim 1, wherein the at least one processor is further configured to:
rotate the rotor in a first direction, and
control the energizing operation of the coil such that demagnetization is performed on a rear side portion of the variable magnet in the first direction that the rotor rotates.

8. The washing machine of claim 7, wherein the at least one processor is further configured to:
rotate the rotor in a second direction that is reverse to the first direction, and
control the energizing operation of the coil such that demagnetization is performed on a rear side portion of the variable magnet in the second direction that the rotor rotates.

9. The washing machine of claim 1, wherein the at least one processor is configured to control the energizing operation of the coil such that magnetic forces of the variable magnets are made uniform when a difference between the variable magnets is greater than a preset reference value.

10. The washing machine of claim 1, wherein the at least one processor is further configured to:
control the energizing operation of the coil to magnetize the variable magnet having a magnetic force less than a predetermined value when increasing the magnetic force of the variable magnet, and
demagnetize the variable magnet having a magnetic force greater than the predetermined value when decreasing the magnetic force of the variable magnet.

11. The washing machine of claim 1, wherein a position sensor provided at an outer side among the plurality of position sensors is an analog type sensor.

12. The washing machine of claim 1, wherein:
a position sensor provided at an outer side among the plurality of position sensors is an analog type hall sensor, and
a position sensor provided at an inner side among the plurality of position sensors is a digital type hall sensor.

13. A motor device comprising:
a stator including a coil;
a rotor including a plurality of variable magnets each having a magnetic force variable and configured to be rotatable with respect to the stator;
at least one processor configured to:
control an energizing operation of the coil to increase or decrease a magnetic force of a variable magnet, and
control the energizing operation of the coil such that magnetization of the variable magnet of the plurality of variable magnets through two-phase energizing is performed within a predetermined range from one end of the variable magnet of the plurality of variable magnets; and
a plurality of position sensors each having an output voltage changed according to a magnetic flux of the variable magnet.

14. The motor device of claim 13, wherein two position sensors adjacent to each other among the plurality of position sensors are spaced apart from each other by an electrical angle of 120 degrees or 90 degrees.

15. The motor device of claim 13, wherein the plurality of position sensors each have output voltage linearly changed according to the magnetic flux of the variable magnet.

16. The motor device of claim 13, wherein two position sensors adjacent to each other among the plurality of position sensors are spaced apart from each other by an electrical angle of 120 degrees or greater.

17. The motor device of claim 13, wherein the at least one processor is configured to:
rotate the rotor in a first direction or a second direction that reverse to the first direction, and
control the energizing operation of the coil such that magnetization is performed on a front side portion of the variable magnet in a direction that the rotor rotates.

18. The motor device of claim 13, wherein the at least one processor is configured to:
rotate the rotor in a first direction or a second direction that is reverse to the first direction, and
control the energizing operation of the coil such that demagnetization is performed on a rear side portion of the variable magnet in a direction that the rotor rotates.

* * * * *